US009868269B2

(12) United States Patent
Chuda et al.

(10) Patent No.: US 9,868,269 B2
(45) Date of Patent: Jan. 16, 2018

(54) ACOUSTIC PANEL MADE OF PLASTER

(71) Applicant: SAINT-GOBAIN PLACO, Suresnes (FR)

(72) Inventors: Katarzyna Chuda, Asnieres sur Seine (FR); Caroline Demathieu-Roeltgen, Meaux (FR); Véronique Chopin, Bruyeres sur Oise (FR); Carl Riddle, Loughborough (GB); Jeremy Simons, Loughborough (GB)

(73) Assignee: SAINT-GOBAIN PLACO, Suresnes (FR)

( * ) Notice: Subject to any disclaimer, the term of this patent is extended or adjusted under 35 U.S.C. 154(b) by 0 days.

(21) Appl. No.: 15/123,919

(22) PCT Filed: Mar. 6, 2015

(86) PCT No.: PCT/FR2015/050550
§ 371 (c)(1),
(2) Date: Sep. 6, 2016

(87) PCT Pub. No.: WO2015/132536
PCT Pub. Date: Sep. 11, 2015

(65) Prior Publication Data
US 2017/0015085 A1    Jan. 19, 2017

(30) Foreign Application Priority Data
Mar. 7, 2014 (FR) ...................... 14 51884

(51) Int. Cl.
B32B 13/08 (2006.01)
B32B 5/02 (2006.01)
B32B 13/02 (2006.01)
B32B 13/14 (2006.01)

(52) U.S. Cl.
CPC .............. B32B 13/08 (2013.01); B32B 5/022 (2013.01); B32B 13/02 (2013.01); B32B 13/14 (2013.01); B32B 2264/0228 (2013.01); B32B 2264/0257 (2013.01); B32B 2307/10 (2013.01); B32B 2419/00 (2013.01); B32B 2607/00 (2013.01)

(58) Field of Classification Search
CPC ......... B32B 13/08; B32B 5/022; B32B 13/02; B32B 13/14; B32B 2264/0228; B32B 2264/0257; B32B 2307/10; B32B 2419/00; B32B 2607/00
USPC ...................................... 428/537.7
See application file for complete search history.

(56) References Cited

U.S. PATENT DOCUMENTS

| 4,239,676 A * | 12/1980 | Wilkinson | C09D 129/14 428/511 |
| 6,699,339 B2 | 3/2004 | Adler et al. | |
| 2002/0123326 A1* | 9/2002 | Iyengar | H04M 1/6505 455/412.1 |
| 2003/0065079 A1* | 4/2003 | Weitzel | C04B 24/2623 524/459 |
| 2006/0265999 A1* | 11/2006 | Dupre, Jr. | B28B 11/24 52/745.19 |

FOREIGN PATENT DOCUMENTS

| EP | 1 110 978 A1 | 6/2001 |
| EP | 1110978 | * 6/2001 |
| WO | WO2004/083307 | * 9/2004 |
| WO | WO 2004/083307 A1 | 9/2004 |

OTHER PUBLICATIONS

International Search Report as issued in International Patent Application No. PCT/FR2015/050550, dated Aug. 24, 2015.

* cited by examiner

Primary Examiner — Leszek Kiliman
(74) Attorney, Agent, or Firm — Pillsbury Winthrop Shaw Pittman LLP

(57) ABSTRACT

A plaster-based board includes a plaster-based core positioned between two sheets of paper or nonwoven fabric, wherein the core contains at least one polymer selected from polyvinyl butyral (PVB), copolymers of vinyl acetate and an olefin, which copolymers have a glass transition temperature that varies from −10° C. to +25° C., terpolymers of vinyl acetate, an olefin and a vinyl ester monomer, terpolymers of vinyl acetate, a vinyl ester monomer and a (meth)acrylate monomer, and copolymers of vinyl acetate and an acrylic monomer.

21 Claims, No Drawings

ACOUSTIC PANEL MADE OF PLASTER

CROSS-REFERENCE TO RELATED APPLICATIONS

This application is the U.S. National Stage of International Application Serial No. PCT/FR2015/050550, filed Mar. 6, 2015, which in turn claims priority to French Application No. 1451884, filed Mar. 7, 2014. The contents of all of these applications are incorporated herein by reference in their entirety.

The invention relates to a plaster-based board endowed with acoustic properties. Such a board may be used in particular for producing a wall, ceiling or floor covering, and a partition wall.

Plaster-based boards are generally composite boards comprising a plaster core positioned between two layers of paper or nonwoven fabric consisting of glass fibers or polymer fibers. These boards have mechanical properties that satisfy the standards in force, in particular a good resistance to deflection under load.

Plaster-based boards as such do not exhibit particular acoustic performances. When it is desired to improve these performances, it is known to combine with said board a sound-insulating material such as a glass or rock wool or a polymer, in order to form a composite product that can be held in place by means of profiles, an adhesive, screws or dowels depending on the targeted use.

The most common plaster-based boards have a mean thickness of 12.5 mm and are generally sold under the name "BA 13". These boards have a surface density of the order of 9 kg/m$^2$. It is certainly well known that it is possible to improve the acoustic performance of a board by increasing its surface density, for example up to 12 kg/m$^2$, without modifying its thickness, but this inevitably results in an increase in the amount of plaster in the board.

Therefore, the cost of the board is higher.

Installing a board having a higher surface density also has drawbacks: due to the increase in the weight, handling the board is more difficult and since it is denser, it is more difficult to attach it using screws. These drawbacks become major drawbacks when the board must be attached at height (partition or ceiling).

The objective of the present invention is to provide a plaster-based board which has improved acoustic properties, while retaining good mechanical properties.

In particular, it is sought to obtain a plaster-based board, the acoustic properties of which are at least equivalent to those of a conventional board of the same thickness but of higher surface density, of the order of 12 kg/m$^2$. The surface density more particularly targeted by the invention varies from 4 to 11 kg/m$^2$, preferably of the order of 9 kg/m$^2$.

This objective is achieved according to the invention owing to the plaster-based board, in particular of the type comprising a plaster-based core positioned between two sheets of paper or nonwoven fabric, characterized in that said core contains at least one polymer.

More specifically, the core of the board comprises plaster and at least one polymer selected from polyvinyl butyral (PVB), copolymers of vinyl acetate and an olefin, which copolymers have a glass transition temperature that varies from −10° C. to +25° C., terpolymers of vinyl acetate, an olefin and a vinyl ester monomer, terpolymers of vinyl acetate, a vinyl ester monomer and a (meth)acrylate monomer, and copolymers of vinyl acetate and an acrylic monomer.

The polyvinyl butyral in accordance with the invention advantageously has a glass transition temperature which varies from 40° C. to 100° C., preferably 50° C. to 90° C. and better still 60° C. to 80° C., measured by differential calorimetry analysis according to the ISO 11357-1:2009 standard.

The preferred polyvinyl butyral is in the form of a powder consisting of particles having a size between 20 and 1000 μm, in particular 50 to 100 μm, 150 to 400 μm or 400 to 1000 μm.

The copolymers of vinyl acetate and an olefin in accordance with the invention are, for example, copolymers of vinyl acetate and at least one monomer selected from ethylene, propylene, butylene and isobutylene. The glass transition temperature of these copolymers preferably varies from −5° C. to +20° C. and advantageously from 0° C. to +10° C. The glass transition temperature of the copolymers is measured by differential calorimetry analysis according to the ISO 11357-1:2009 standard. Copolymers of vinyl acetate and ethylene (EVA) are preferred.

The terpolymers of vinyl acetate, an olefin and a vinyl ester monomer are, for example, terpolymers of vinyl acetate, an olefin as defined in the preceding paragraph and alkyl acrylate or methacrylate.

The terpolymers of vinyl acetate, a vinyl ester monomer and a (meth)acrylate monomer are, for example, terpolymers of vinyl acetate, vinyl ester of versatic acid (referred to as VeoVa10) and acrylate.

The copolymers of vinyl acetate and an acrylic monomer are, for example, copolymers of vinyl acetate and alkyl acrylate or methacrylate.

The polymer represents in general 1% to 40% by weight of the mixture constituted by the plaster and the polymer, preferably 3% to 30% and advantageously 5% to 20%.

The polymer in accordance with the invention is advantageously in the form of particles having a mean dimension which varies from 0.01 to 1200 μm, preferably from 0.1 to 1000 μm, and better still from 0.2 to 400 μm.

The core of the board according to the invention may additionally contain additives that improve the physico-chemical properties of the final product and make it possible to obtain good application conditions. The core may thus comprise the following additives in the following weight proportions, expressed as parts per 100 parts by weight of plaster:

0.1 to 15 parts of an adhesion agent, the role of which is to increase the adhesion of the paper coating with the plaster, for example a starch, in particular pretreated with an acid, a dextrin or a vegetable flour, in particular wheat or corn flour, 0.001 to 10 parts of a setting accelerator, for example hydrated calcium sulfate or potassium sulfate, 0.001 to 10 parts of a setting retarder, 0 to 10 parts of a biocide, for example sodium omadine, 0.0001 to 1 part of a foaming agent, the role of which is to create pores in order to reduce the density of the final product. By way of example, mention may be made of sodium sulfate alkyl ethers and sodium lauryl sulfate, 0 to 10 parts of at least one water repellent, for example a siloxane or a polysiloxane, 0 to 20 parts of at least one fire retardant, for example vermiculite, silica, in particular of micrometer size, a clay or metal fibers, 0 to 20 parts of at least one reinforcer, for example polymer fibers, mineral fibers, in particular glass fibers, and animal or vegetable fibers.

Another subject of the invention relates to a process for manufacturing the plaster-based board, in particular of the type comprising a core positioned between two layers of paper or nonwoven fabric, that has just been described.

The process is characterized in that, in order to produce the core of the board, at least one polymer selected from polyvinyl butyral (PVB), copolymers of vinyl acetate and an olefin, which copolymers have a glass transition temperature that varies from −10° C. to +25° C., terpolymers of vinyl acetate, an olefin and a vinyl ester monomer, terpolymers of vinyl acetate, a vinyl ester monomer and a (meth)acrylate monomer, and copolymers of vinyl acetate and an acrylic monomer is added to calcined gypsum.

The manufacture of plaster-based boards is known per se. The plasterboard is formed according to a continuous process which consists in mixing powdered calcined gypsum (calcium sulfate hemihydrate) with water in order to form a paste which is deposited continuously between two sheets of paper or nonwoven fabric containing mineral fibers, in particular glass fibers, or polymer fibers.

The product formed is pressed in order to obtain the desired thickness, then it is transported continuously on a conveyor over a distance that enables the paste to attain a sufficient degree of hardening in order to be able to be cut into boards of given length. The boards are then dried in an oven in order to eliminate the excess water.

Conventionally, calcium sulfate hemihydrate ($CaSO_4.0.5H_2O$; calcined gypsum), whether it is natural or synthetic, that is to say derived in particular from the desulfurization of thermal power plant gases, undergoes a hydration reaction in the presence of water and is converted into calcium sulfate dihydrate ($CaSO_4.2H_2O$: gypsum).

The amount of calcined gypsum used to form the paste generally varies from 50 to 150 parts by weight per 100 parts by weight of water, and preferably from 60 to 120 parts.

The polymer may be in the form of an aqueous solution or dispersion, a powder or pellets. In the case of a solution or dispersion, this polymer is added to the water used to prepare the paste. When it is a question of a powder or pellets, the addition is carried out with the calcined gypsum before it is mixed with the water to form the paste. Dispersions and powders are preferred.

Although the thickness of the plaster-based board more particularly targeted is equal to 12.5 mm, a lesser thickness, in particular down to 6 millimeters, or greater thickness, in particular up to 25 millimeters, cannot be excluded.

The plaster-based board in accordance with the invention may be used as is or in combination with another material, for example a mineral wool or wood wool, or a polymer in order to form an acoustic and/or thermal panel, or else an interlayer polymer film that provides the bond between two plaster-based boards in order to form a composite panel.

This board may be used in order to form wall coverings, false ceilings, floors and partition walls.

Another subject of the invention relates to the use of a polymer selected from polyvinyl butyral (PVB), copolymers of vinyl acetate and an olefin, which copolymers have a glass transition temperature that varies from −10° C. to +25° C., terpolymers of vinyl acetate, an olefin and a vinyl ester monomer, terpolymers of vinyl acetate, a vinyl ester monomer and a (meth)acrylate monomer, and copolymers of vinyl acetate and an acrylic monomer in a composition based on calcined gypsum intended for the manufacture of a plaster-based board in order to improve the acoustic performance of said board.

The composition suitable for the manufacture of the plaster-based board described above also forms one subject of the present invention. This plaster-based composition comprises calcined gypsum and at least one polymer selected from polyvinyl butyral (PVB), copolymers of vinyl acetate and an olefin, which copolymers have a glass transition temperature that varies from −10° C. to +25° C., terpolymers of vinyl acetate, an olefin and a vinyl ester monomer, terpolymers of vinyl acetate, a vinyl ester monomer and a (meth)acrylate monomer, and copolymers of vinyl acetate and an acrylic monomer. The composition may be used in particular for producing joints.

The examples that follow make it possible to illustrate the invention without however limiting it.

EXAMPLES 1 TO 15

Plaster-based boards are prepared from the compositions given in table 1.

Calcium sulfate hemihydrate, the polymer and water are introduced into a mixer.

The mixture is stirred for 15 seconds at 600 rpm and 45 seconds at 1850 rpm. The foaming agent is then added and the mixture is stirred at 250 rpm for 50 seconds in order to obtain a paste.

The paste is poured into a brass mold comprising four parallelepipedal cavities (length: 300 mm; width: 30 mm; depth: 13 mm), the internal walls of which have been precoated with a layer of oil. The samples are removed from the mold after 20 minutes, then left in the open air for 40 minutes and finally dried in an oven at 40° C. until their weight remains constant.

By way of comparison, prepared under the same conditions were two boards containing no polymer and having a surface density equal to 9.0 and 11.9 kg/m² (comparative examples 10 and 11) and four boards containing a polymer not included in the invention (comparative examples 12 to 15).

The acoustic performances of the boards are evaluated by measuring their mechanical impedance MIM (Measurement of Mechanical Impedance) under the conditions of the ISO 16940:2008(E) standard. From the curve of the acceleration frequency (dB) as a function of the frequency (Hz), the dynamic Young's modulus (in GN/m²) and the loss factor (in %) are calculated.

The samples are bars having a length of 300 mm, a width of 30 mm and a thickness of 13 mm.

The values of the Young's modulus, the loss factor and the acoustic gain calculated with respect to the reference boards from comparative examples 10 and 11 appear in table 1.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Composition |  |  |  |  |  |  |  |  |
| Calcined gypsum[(1)](g) | 800 | 800 | 1000 | 800 | 900 | 900 | 1000 | 1000 |
| Water (g) | 750 | 750 | 800 | 750 | 750 | 750 | 650 | 700 |
| Foam[(2)](g) | 47 | 47 | 0 | 30 | 35 | 30 | 30 | 30 |
| Polymer (g) |  |  |  |  |  |  |  |  |

TABLE 1-continued

| | | | | | | | | |
|---|---|---|---|---|---|---|---|---|
| Aqueous dispersion | — | — | 200[5] | — | — | — | 200[8] | 100[8] |
| Powder | 200[3] | — | — | 200[6] | 100[6] | 200[7] | — | — |
| Pellets | — | 200[4] | — | — | — | — | — | — |
| Properties | | | | | | | | |
| Surface density (kg/m$^2$) | 9.1 | 9.3 | 10.2 | 9.0 | 9.0 | 9.1 | 9.0 | 9.1 |
| Dynamic Young's modulus (GN/m$^2$) | 1.52 | 1.80 | 1.74 | 1.55 | 1.99 | 1.82 | 1.59 | 2.19 |
| Loss factor (%) | 2.61 | 1.86 | 1.76 | 6.5 | 3.8 | 2.3 | 7.69 | 3.47 |
| Acoustic gain (%) | | | | | | | | |
| with respect to Ex. 10 | 47.9 | 38.3 | 40.4 | 46.9 | 31.8 | 37.7 | 45.5 | 25 |
| with respect to Ex. 11 | 59.5 | 52.1 | 53.7 | 58.7 | 47.0 | 51.5 | 57.7 | 41.7 |

| | Ex. 9 | Comp. Ex. 10 | Comp. Ex. 11 | Comp. Ex. 12 | Comp. Ex. 13 | Comp. Ex. 14 | Comp. Ex. 15 |
|---|---|---|---|---|---|---|---|
| Composition | | | | | | | |
| Calcined gypsum[1](g) | 1000 | 1000 | 1000 | 800 | 800 | 800 | 1000 |
| Water (g) | 650 | 750 | 750 | 750 | 750 | 750 | 650 |
| Foam[2](g) | 30 | 40 | 13 | 47 | 47 | 47 | 30 |
| Polymer (g) | | | | | | | |
| Aqueous dispersion | 200[9] | — | — | 200[10] | 200[11] | 200[12] | 200[13] |
| Powder | — | — | — | — | — | — | — |
| Pellets | — | — | — | — | — | — | — |
| Properties | | | | | | | |
| Surface density (kg/m$^2$) | 9.2 | 9.0 | 11.9 | 9.1 | 9.3 | 9.3 | 9.3 |
| Dynamic Young's modulus (GN/m$^2$) | 2.13 | 2.92 | 3.76 | 2.82 | 2.71 | 2.89 | 2.84 |
| Loss factor (%) | 2.59 | 0.5 | 0.5 | 1.01 | 0.54 | 0.73 | 0.91 |
| Acoustic gain (%) | | | | | | | |
| with respect to Ex. 10 | 27 | — | — | 3.4 | 7.1 | 1.0 | 2.7 |
| with respect to Ex. 11 | 38.5 | — | — | — | — | — | — |

[1]Recycled plaster, without paper CP1 sold by the company Saint-Gobain Placo
[2]Millifoam ® C sold by the company Huntsman; solids content: 30%
[3]Shark Powder ® C2 sold by the company Shark; polyvinyl butyral; solids content: 100%
[4]Shark Pellets ® C3 sold by the company Shark; polyvinyl butyral; solids content: 100%
[5]Shark Dispersion ® C3 sold by the company Shark; polyvinyl butyral; solids content: 50%
[6]Vinnapas ® 5044 N sold by the company Wacker Chemie; ethylene-vinyl acetate copolymer (Tg-7° C.); solids content: 100%
[7]Vinnapas ® 7055 E sold by the company Wacker Chemie; vinyl acetate-ethylene-vinyl ester terpolymer; solids content: 100%
[8]Emultex ® VV 665 sold by the company Synthomer; vinyl acetate-VeoVa10-acrylate terpolymer; solids content: 50%
[9]Emultex ® VV 675 sold by the company Synthomer; vinyl acetate-VeoVa10-acrylate terpolymer; solids content: 50%
[10]Plextol ® DV 686 sold by the company Synthomer; styrene-acrylate copolymer; solids content: 50%
[11]Synthomer ® VL 10946 sold by the company Synthomer; carboxylated styrene-butadiene copolymer; solids content: 50%
[12]Litex ® N 5140 sold by the company Synthomer; carboxylated butadiene-acrylonitrile copolymer; solids content: 50%
[13]Plextol ® X 4427 sold by the company Synthomer; acrylic copolymer; solids content: 50%

The invention claimed is:

1. A plaster-based board, comprising a plaster-based core positioned between two sheets of paper or nonwoven fabric, wherein said core contains at least one polymer selected from polyvinyl butyral (PVB), copolymers of vinyl acetate and an olefin, which copolymers have a glass transition temperature that varies from −10° C. to +25° C., terpolymers of vinyl acetate, an olefin and a vinyl ester monomer, terpolymers of vinyl acetate, a vinyl ester monomer and a (meth)acrylate monomer, and copolymers of vinyl acetate and an acrylic monomer.

2. The board as claimed in claim 1, wherein the copolymers of vinyl acetate and an olefin have a glass transition temperature that varies from −5° C. to +20° C.

3. The board as claimed in claim 1, wherein the polymer represents 1% to 40% by weight of the mixture constituted by the plaster and the polymer.

4. The board as claimed in claim 1, wherein the polymer is in the form of particles having a mean dimension which varies from 0.01 to 1200 μm.

5. The board as claimed in claim 1, further comprising the following additives in the following weight proportions, expressed per 100 parts by weight of plaster:
0.1 to 15 parts of an adhesion agent,
0.001 to 10 parts of a setting accelerator,
0.001 to 10 parts of a setting retarder,
0 to 10 parts of a biocide,
0.0001 to 1 part of a foaming agent,
0 to 10 parts of at least one water repellent,
0 to 20 parts of at least one fire retardant,
0 to 20 parts of at least one reinforcer.

6. A process for manufacturing a board comprising a core positioned between two sheets of paper or nonwoven fabric, the process comprising mixing powdered calcined gypsum with water in order to form a paste, depositing the paste continuously between said sheets to form a product, pressing the product formed in order to obtain a desired thickness, cutting the board to a desired length, wherein, in order to produce the core of the board, at least one polymer selected from polyvinyl butyral (PVB), copolymers of vinyl acetate and an olefin, which copolymers have a glass transition temperature that varies from −10° C. to +25° C., terpolymers of vinyl acetate, an olefin and a vinyl ester monomer, terpolymers of vinyl acetate, a vinyl ester monomer and a (meth)acrylate monomer, and copolymers of vinyl acetate and an acrylic monomer is added to the calcined gypsum.

7. A method comprising utilizing a polymer selected from polyvinyl butyral (PVB), copolymers of vinyl acetate and an olefin, which copolymers have a glass transition temperature that varies from −10° C. to +25° C., terpolymers of vinyl acetate, an olefin and a vinyl ester monomer, terpolymers of vinyl acetate, a vinyl ester monomer and a (meth)acrylate monomer, and copolymers of vinyl acetate and an acrylic monomer in a composition based on calcined gypsum for the manufacture of a plaster-based board in order to improve the acoustic performance of said board.

8. A plaster-based composition, comprising calcined gypsum and at least one polymer selected from polyvinyl butyral (PVB), copolymers of vinyl acetate and an olefin, which copolymers have a glass transition temperature that varies from −10° C. to +25° C., terpolymers of vinyl acetate, an olefin and a vinyl ester monomer, terpolymers of vinyl acetate, a vinyl ester monomer and a (meth)acrylate monomer, and copolymers of vinyl acetate and an acrylic monomer.

9. The board as claimed in claim 2, wherein the glass transition temperature varies from 0° C. to +10° C.

10. The board as claimed in claim 3, wherein the polymer represents 3% to 30% by weight of the mixture constituted by the plaster and the polymer.

11. The board as claimed in claim 10, wherein the polymer represents 5% to 20% by weight of the mixture constituted by the plaster and the polymer.

12. The board as claimed in claim 4, wherein the polymer is in the form of particles having a mean dimension which varies from 0.1 to 1000 µm.

13. The board as claimed in claim 12, wherein the polymer is in the form of particles having a mean dimension which varies from 0.2 to 400 µm.

14. The board as claimed in claim 5, wherein the adhesion agent is a starch.

15. The board as claimed in claim 14, wherein the starch is pretreated with an acid, a dextrin or a vegetable flour.

16. The board as claimed in claim 5, wherein the accelerator is hydrated calcium sulfate or potassium sulfate.

17. The board as claimed in claim 5, wherein the bioacide is sodium omadine.

18. The board as claimed in claim 5, wherein the foaming agent is a sodium sulfate alkyl ether or sodium lauryl sulfate.

19. The board as claimed in claim 5, wherein the at least one water repellent is a siloxane or a polysiloxane.

20. The board as claimed in claim 5, wherein the at least one fire retardant is vermiculite, silica, a clay or metal fibers.

21. The board as claimed in claim 5, wherein the at least one reinforcer is made of polymer fibers, mineral fibers or animal or vegetable fibers.

* * * * *